United States Patent

[11] 3,549,179

| [72] | Inventor | Robert G. Cox<br>Jackson, Mich. |
|---|---|---|
| [21] | Appl. No. | 824,468 |
| [22] | Filed | May 14, 1969 |
| [45] | Patented | Dec. 22, 1970 |
| [73] | Assignee | Aeroquip Corporation<br>Jackson, Mich. |

[54] SPLIT FLANGE CONNECTION
4 Claims, 10 Drawing Figs.

[52] U.S. Cl. ..................................................... 285/189,
285/368
[51] Int. Cl. ..................................................... F16l 41/00
[50] Field of Search ........................................... 285/158,
189, 369, 412

[56] References Cited
UNITED STATES PATENTS
2,681,817   6/1954   Demlow .................... 285/368X
2,749,149   6/1956   Carpenter .................... 285/189

*Primary Examiner*—Dave W. Arola
*Attorney*—Jerry K. Harness

ABSTRACT: A split flange for attaching an annular conduit shoulder, carrying a seal, to the face of an accessory port. The flange comprises two generally semicircular halves of indentical shape, each having three holes and overlapping ends. Two of the holes are adjacent each other at one end of each flange half, and the other hole is at the opposite end. A foot on each flange half outside the two adjacent bolt holes engages the accessory port face so that bolt tightening will cause the opposite end of the flange half to be drawn down against the shoulder because of the lever action, the foot acting as a fulcrum. The two end holes in each flange half are diametrically opposed to pull the shoulder squarely against the accessory surface.

In a modified form of the invention, the foot is replaced by a nylon or other plastic shim attached to the flange halves. In a third embodiment, a corrugated washer is used for the foot.

PATENTED DEC 22 1970
3,549,179
SHEET 1 OF 2
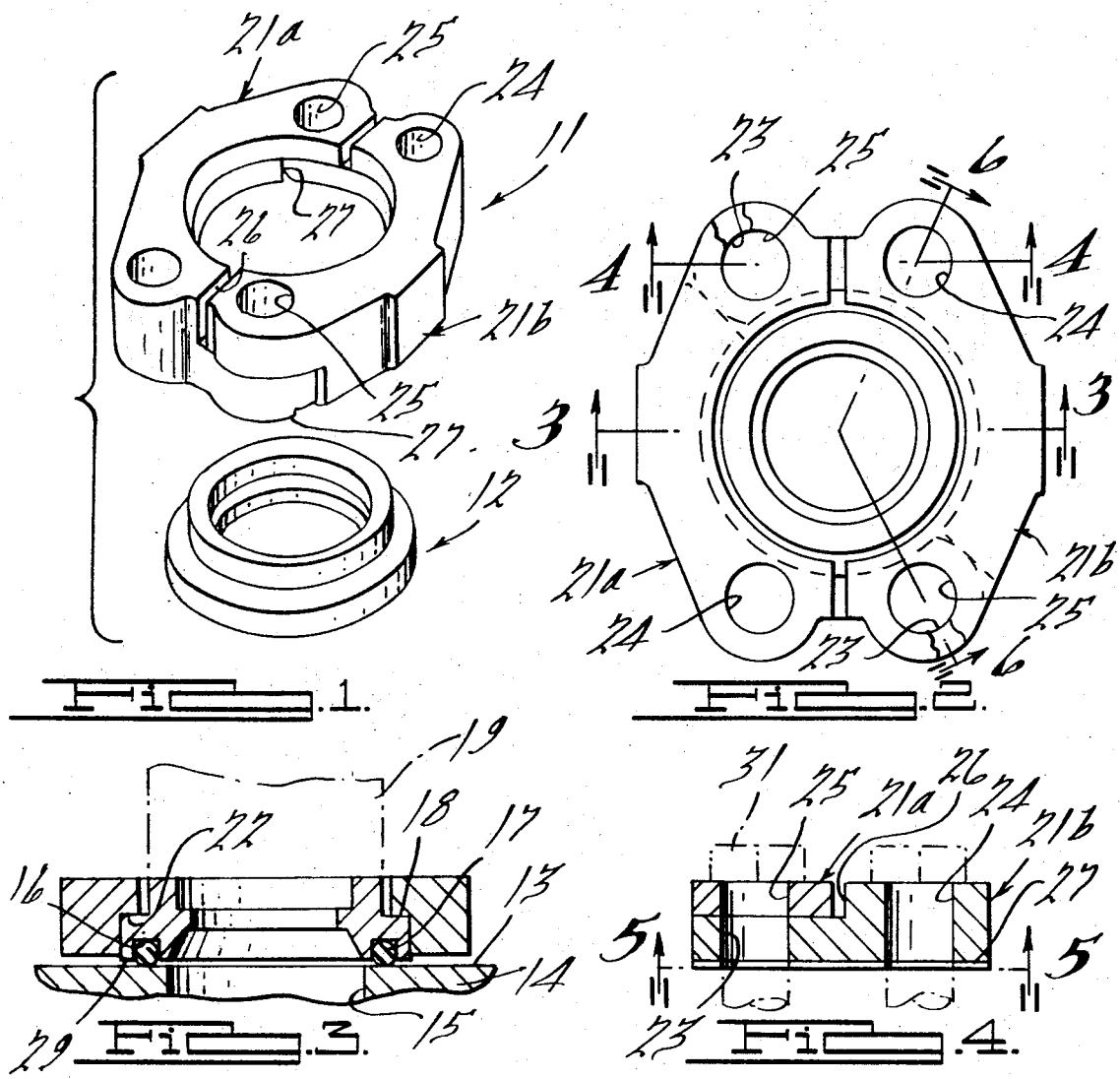
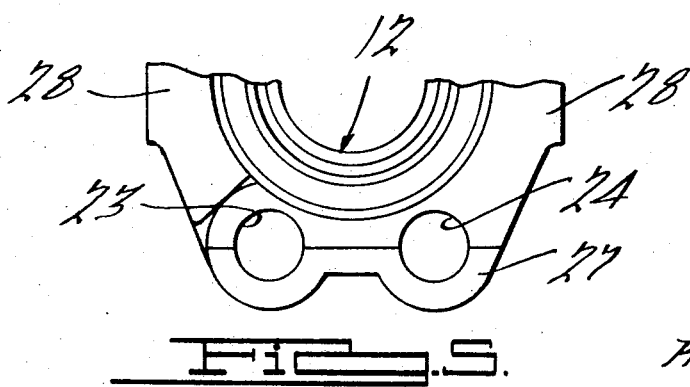
INVENTOR.
Robert G. Cox
BY
Jerry K Harness
ATTORNEY.

PATENTED DEC 22 1970
3,549,179
SHEET 2 OF 2
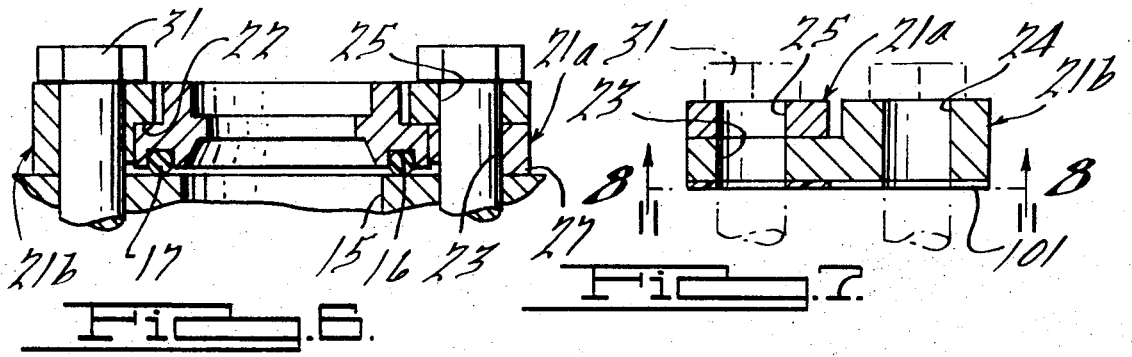
FIG. 6.
FIG. 7.
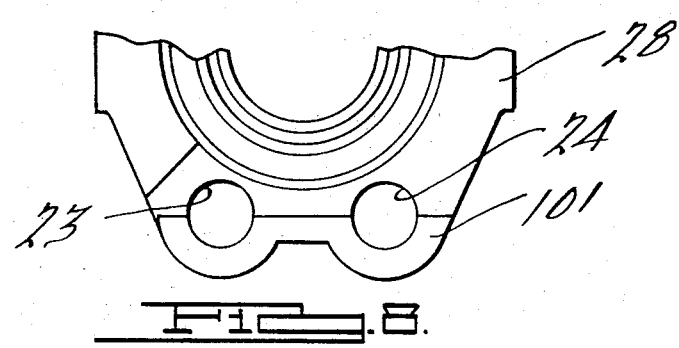
FIG. 8.
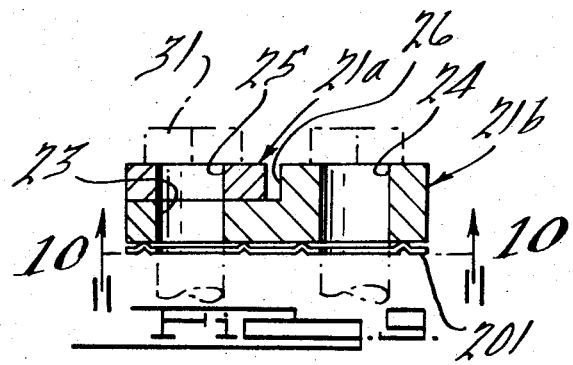
FIG. 9.
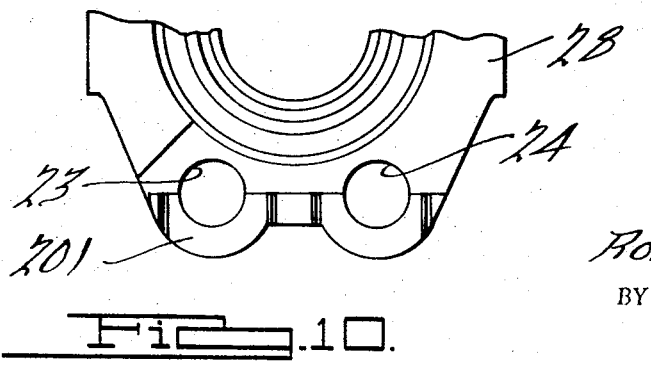
FIG. 10.
INVENTOR.
Robert G. Cox
BY
Jerry K Harness
his ATTORNEY.

3,549,179

SPLIT FLANGE CONNECTION

BACKGROUND OF THE INVENTION

1. Field of the Invention

The invention relates to means for connecting annular conduit shoulders carrying seals such as O-rings to the flat port surfaces of accessories such as blocks, heads or conduits. A split flange connection is used where it is impractical to mount a one-piece flange on the shoulder being attached. Such connections are often subjected to very high fluid pressures tending to force the seals radially outwardly and create leakage.

2. Description of the Prior Art

A conventional type of split flange connection is shown in SAE Standard J518b (see also Demlow U.S. Pat. No. 2,681,817). This connection is a four-bolt nonoverlapping split flange type comprising two clamp halves bolted to the accessory face. Radial surfaces on the flange halves engage the shoulder and draw it toward the accessory face. In this standard flange connection, the flange halves are relieved with respect to the shoulder thickness by about 0.020 inches to insure proper engagement of the shoulder with the accessory face.

This construction has several disadvantages which have sometimes resulted in unsatisfactory and leaky connections, particularly under high pressure. It has been found, for example, that careless bolt torquing can result in one or both flange halves tilting slightly to one side, thus cocking the shoulder so that the seal on the other side could be forced out of its recess. Another problem with the conventional four-bolt split flange connection is the tendency of the bolt as well as the flange halves themselves to bend, the central portions of the flange halves bowing outwardly so that the clamping force is unevenly distributed along the shoulder. As a result, this conventional connection is very sensitive to human error and bolt torquing, and all bolts must be installed and torqued evenly to obtain proper results.

SUMMARY OF THE INVENTION

The present invention is intended to provide a split flange connection which fully meets the bolt location specifications of the aforementioned SAE standard, but overcomes the problems which exist with conventional four-hole split flange connections and assures a tight seal regardless of the sequence of bolt torquing. The flange comprises two indentical halves each of generally semicircular shape and having a pair of adjacent bolt holes at one end and a third bolt hole at the other end. The main portion of each flange half has a shoulder engaging surface, but in the vicinity of the outer of the two adjacent bolt holes, the thickness is reduced by a notch. The portion of each flange half surrounding the single bolt hole at the other end is also reduced in thickness by a notch so that the single bolt hole on each flange half will overlie the outer of the two adjacent bolt holes on the other flange half. The flange halves are relieved with respect to the thickness of the shoulder so that the latter will be drawn tightly against the accessory face. However, a foot is formed on the outer portion of each flange half near the two adjacent bolt holes. When tightening the bolts, this foot will engage the accessory surface and act as a fulcrum, whereby tightening of either bolt in the two adjacent bolt holes will pull down the remote end of the flange half. Thus, tightening any bolt will draw both sides of the flange against the accessory face so that the shoulder will not have a tendency to cock. Furthermore, two of the bolts on each flange half are diametrically opposite each other so that the shoulder will be drawn squarely against the accessory face.

The shoulder can still be removed by unscrewing two bolts from the flange and swinging the flange halves apart, as in the prior construction. Furthermore, the need for a captive flange on a tube or hose is eliminated because of the interlocking action of this flange connection. Thus, the necessity of sawing off a captive flange which has been damaged is eliminated.

BRIEF DESCRIPTION OF THE DRAWINGS

FIG. 1 is an exploded perspective view of two mating flange halves of the novel connection together with a conduit shoulder which the flange halves are to secure to a port surface;

FIG. 2 is a top plan view of the flange halves in mating position and engaging the shoulder;

FIG. 3 is a cross-sectional view in elevation taken along the line 3—3 of FIG. 2 and showing the engagement of the O-ring seal with the accessory face;

FIG. 4 is a cross-sectional view in elevation taken along the line 4—4 of FIG. 2 and showing the overlapping nature of the flange halves;

FIG. 5 is a fragmentary bottom plan view taken along the lines 5—5 of FIG. 4 of portions of the flange halves and showing the area in which the foot of each flange half is located;

FIG. 6 is a cross-sectional view in elevation taken along the line 6—6 of FIG. 2 and showing the fulcrum action of the foot;

FIG. 7 is a view similar to FIG. 4 of a modified form of the invention in which the foot is formed formed by a plastic shim;

FIG. 8 is a fragmentary bottom plan view taken along the line 8—8 of FIG. 7 and showing the shape of the plastic shim;

FIG. 9 is a view similar to FIGS. 4 and 7 of a third embodiment of the invention which uses a separable corrugated shim, and FIG. 10 is a fragmentary bottom plan view taken along the line 10—10 of FIG. 9 and showing the configuration of the shim.

DESCRIPTION OF THE PREFERRED EMBODIMENTS

Referring first to the embodiments of FIGS. 1 through 6, the flange is generally indicated at 11 and is intended to securely clamp a conduit shoulder generally indicated at 12 to the face 13 of an accessory 14 having a port 15. Shoulder 12 is annular shape and has a groove 16 within which is disposed an O-ring or similar seal 17. The shoulder has a radial surface 18 facing away from seal 17 and engageable by flange 11 to draw the seal and shoulder against face 13. Shoulder 12 is connected to a hose or other conduit indicated in dot-dash lines at 19, which is to be connected to port 15. Due to the relatively high pressures which are often involved, the shoulder and seal must be pressed evenly against the accessory face around its entire periphery.

Flange 11 is made up of two identical flange halves generally indicated at 21a and 21b respectively. Each flange half 21 has a generally semicircular shape. The effective thickness (defined below) of the main portion of flange half 21 is approximately equal to but slightly less than the effective thickness of shoulder 12, so as to assure that the shoulder will be drawn against surface 13 in a manner later described. Each flange half has a radial surface 22 engageable with surface 18 to draw shoulder 12 toward surface 13.

Each flange half 21 has three bolt holes 23, 24 and 25. Bolt holes 23 and 24 are adjacent each other at one end of flange half 21, whereas bolt hole 25 is remote from the others at the other end of the flange halves. Bolt hole 24 extends through the complete thickness of the flange half but this thickness is reduced to the height of the shoulder 18 in the vicinity of bolt hole 23 by a notch 26 in the side of the flange half remote from accessory face 13. The thickness of the flange half is also reduced in the vicinity of bolt hole 25 by a notch in the side of the flange half adjacent face 13. The arrangement is therefore such that the portion of flange half 21a in the vicinity of its bolt hole 25 will overlap the portion of flange half 21b in the vicinity of its bolt hole 23, and vice versa, as seen in FIG. 1. Bolt holes 23 and 25 of each flange half are diametrically opposite each other, as shown in FIG. 2.

A foot 27 is formed on the relieved surface 28 of each flange half in the vicinity of bolt holes 23 and 24. The configuration of this foot is seen in FIG. 5, the foot being integral with the flange half and disposed outwardly of the centerlines of the bolt holes. The thickness of foot 27 is such as to bring its outer surface approximately into or slightly beyond the plane of surface 29 on shoulder 12 which faces surface 13.

The effective thickness of shoulder 12 may be defined as the distance from surface 18 to surface 29. The effective thickness of each flange half may be defined as the distance from surface 22 to surface 28. Foot 27 serves to increase this effective thickness at one end of each flange half.

When the flange halves are assembled with the shoulder and bolts 31 are tightened, foot 27 will act as a fulcrum, as seen in FIG. 6. Therefore, tightening of a bolt in either bolt hole 23 or 24 of a flange half will result in both the adjacent and remote ends of the flange halves being drawn downwardly toward surface 13. Tightening of the bolt in hole 25 will have the same result, since this will draw down the end of the other flange half carrying the foot, and the latter will act as a fulcrum. This there will be no tendency for shoulder 12 to cock to one side when any bolt is tightened. The bolts may be tightened in a random sequence while still assuring equal sealing forces around the entire periphery of shoulder 12. Furthermore, because two bolt holes in each flange half are diametrically opposite each other, tightening of the bolts will result in each flange half drawing the shoulder squarely against surface 13.

It should be noted that after assembly, in order to remove shoulder 12 it is merely necessary to remove two bolts which pass through bolt holes 24 and 25 of either flange half, thus permitting the flange half to be swung away to gain access to shoulder 12.

FIGS. 7 and 8 show a modified form of the invention in which a shim 101 of nylon or a similar plastic material replaces foot 27. The thickness and configuration of shim 101 will be similar to that of foot 27 and the shim may be secured to its flange half by an appropriate adhesive material.

FIGS. 9 and 10 shows a third embodiment of the invention, in which foot 27 is replaced by a separable corrugated shim 201. This shim will result in increasing the effective flange thickness to maintain it in full contact with surface 13, thereby permitting the fulcrum action to take place. However, shim 201 is somewhat more yieldable than foot 27 in response to bolt pressure.

In the forms of the invention shown in FIGS. 7 through 10, it will be appreciated that the feet 101 and 201 will also compensate for tolerance in the height of shoulder 18 when the device is under bolting compression due to their yieldability.

I claim:

1. A split flange connection for drawing an annular conduit shoulder carrying a seal against an accessory face comprising a pair of identical generally semicircular flange halves, each flange half having a surface engageable with with the shoulder to draw it toward the accessory face, each flange half having a main portion with an effective thickness slightly less than the effective thickness of the shoulder, three bolt holes in each flange half, two of the bolt holes being adjacent each other in one end of the flange half and the other bolt hole being a single hole at the other end, a notch in the vicinity of the outermost of the adjacent pair of bolt holes on the side of the flange half remote from the accessory face, a notch in the vicinity of the single bolt hole on the side of the flange half facing the accessory face whereby the single bolt hole of each flange half will overlap the outer of the two adjacent bolt holes on the other flange half, and a foot formed on the surface of each flange half outwardly of the two adjacent bolt holes facing the accessory surface, the effective thickness of the flange half at said foot being approximately equal to the effective thickness of said shoulder, whereby sad foot will act as a fulcrum when either of the bolts in said adjacent pair of bolt holes is tightened so as to draw the remote end of the flange half downwardly against the shoulder.

2. The combination according to claim 1, said foot being integrally formed with said flange half.

3. The combination according to claim 1, said foot comprising a plastic shim adhesively secured to the flange half.

4. The combination according to claim 1, said foot comprising a separable corrugated shim yieldable in response to pressure.